Figure 1:
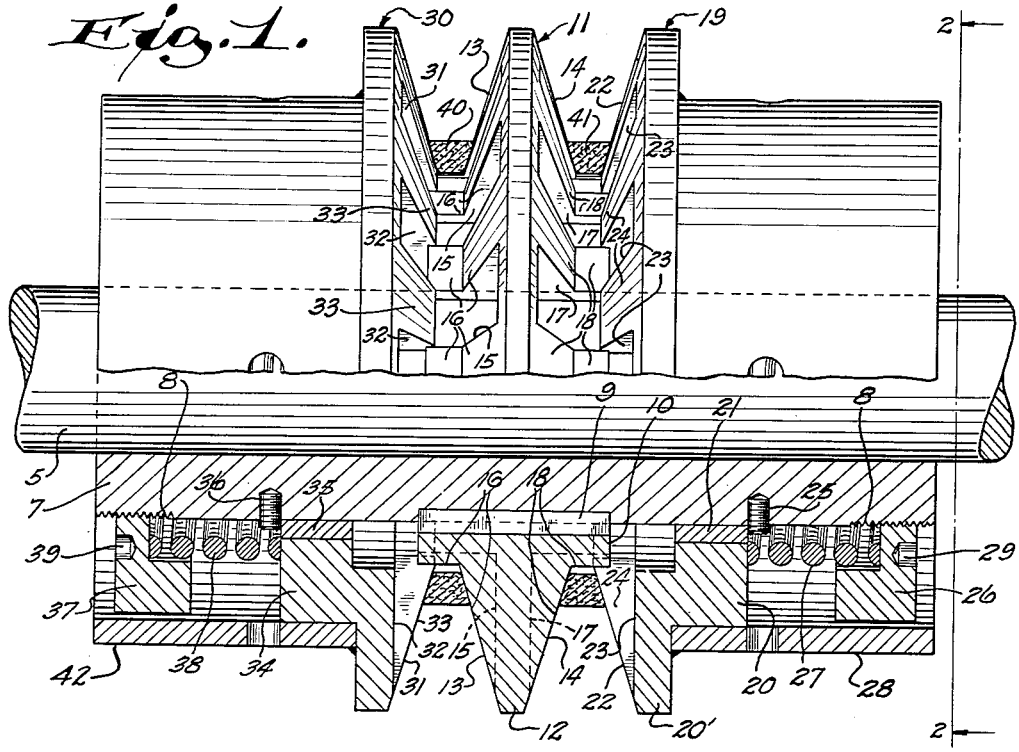

April 10, 1956  O. G. NUMAN  2,741,135

VARIABLE WIDTH PLURAL SHEAVE V-BELT PULLEYS

Filed Oct. 18, 1952

INVENTOR.
Orange G. Numan
BY
Morsell & Morsell
ATTORNEYS.

2,741,135

VARIABLE WIDTH PLURAL SHEAVE V-BELT PULLEYS

Orange G. Numan, Suamico, Wis., assignor to Fort Howard Paper Company, Green Bay, Wis., a corporation of Wisconsin Application October 18, 1952, Serial No. 315,537

3 Claims. (Cl. 74—230.17)

This invention relates to improvements in variable width plural sheave V-belt pulleys.

It is a general object of the present invention to provide an improved variable width plural sheave V-belt pulley which is suitable for use in connection with a complementary, selectively adjustable, variable width, plural sheave pulley to automatically maintain constant tension on the connecting belts regardless of the selected adjustment of the sheaves of said complementary pulley.

A further object of the invention is to provide an improved pulley of the class described which is compact, simple and foolproof in construction, and inexpensive to manufacture.

A more specific object of the invention is to provide an improved pulley of the class described wherein there are axially movable, spring-loaded side members which are cooperable with the connecting belts, said pulley also having means for readily adjusting the pressure which is exerted on said belts by said side members.

A further object of the invention is to provide an improved pulley of the class described wherein there is a two-sided belt-engaging sheave portion fixed on a shaft, there being a spring loaded, axially slidable, belt engaging sheave portion positioned on said shaft on each side of said fixed portion and normally urged toward the latter, said fixed and slidable sheave portions having axially extending fingers which interfit in all positions of adjustment of the slidable sheave portions to provide a continuous driving connection for the latter, thereby eliminating the necessity for a direct driving connection between the shaft and the axially movable sheave portions.

With the above and other objects in view, the invention consists of the improved variable width, plural sheave V-belt pulley, and all of its parts and combinations, as set forth in the claims, and all equivalents thereof.

Figure 2:
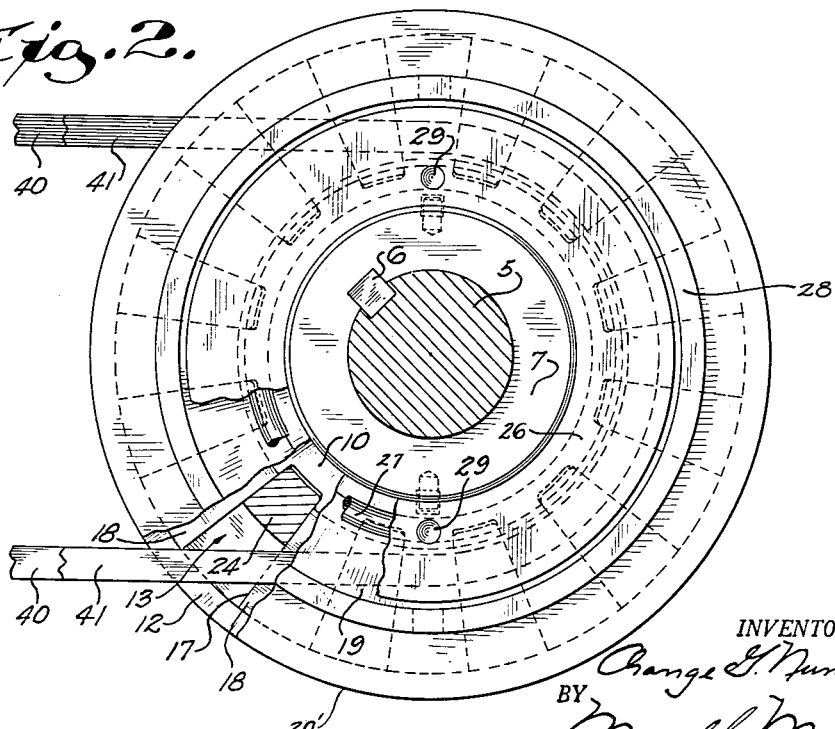

In the drawing accompanying and forming a part of this specification, wherein one complete embodiment of the preferred form of the invention is shown, and wherein like characters of reference indicate the same parts in all of the views:

Fig. 1 is a side elevational view of the improved pulley, parts being broken away and shown in radial section; and Fig. 2 is an end view of the improved pulley taken approximately along the line 2—2 of Fig. 1, parts being broken away.

Referring more particularly to the drawing, the numeral 5 indicates a shaft on which the improved pulley is adapted to be drivingly mounted. Keyed onto said shaft, as by a key 6 (Fig. 2), is a sleeve 7 forming a main hub and having external threading 8 at each end. Fixed on an intermediate portion of the sleeve 7, as by a key 9, is the hub 10 of a two-sided sheave portion 11, which portion includes a radially outwardly directed annular flange 12 having opposite frusto-conical belt engaging faces 13 and 14.

The face 13 and the adjacent peripheral surface of hub 10 are formed with spaced radial recesses 15 to provide radially and axially extending fingers 16. The face 14 and the adjacent peripheral surface of hub 10 are formed with spaced radial recesses 17 to provide radially and axially extending fingers 18.

Axially slidably mounted on sleeve 7 at one side of the member 11 is a movable sheave portion 19 having a hub 20 provided with a bearing shell 21. A radially and outwardly directed annular flange 20' is formed on hub 20 and said flange has a frusto-conical belt engaging face 22 facing the face 14 of sheave portion 11 and forming a belt receiving groove therewith. A plurality of spaced, radially extending recesses 23 are formed in the face 22 to provide fingers 24 which are slidably positioned in the recesses 17 of the fixed sheave portion 11, the fingers 18 of the latter being slidably positioned in the recesses 23 of the portion 19. Thus, a direct driving connection between the sheave portions 11 and 19, through the interengaging fingers 18 and 24, is maintained at all times. A set screw 25 which is threaded into the sleeve 7 limits the axial outward travel of the member 19 and prevents the fingers 18 and 24 from moving out of engagement. A retaining collar 26 is threaded on the right hand portion 8 (Fig. 1) of sleeve 7, and a helical compression spring 27 is positioned around the sleeve 7, with one end abutting the hub 20 and with its other end abutting the collar 26. A sleeve 28 which fits telescopically onto hub 20 is welded in place and it projects coaxially outwardly to enclose the spring 27 and collar 26. The collar 26 may be formed with suitable recesses 29 in its outer face for the insertion of a tool.

A movable sheave portion 30, which may be identical with the portion 19, is axially slidably mounted on sleeve 7 on the opposite side of fixed portion 11. The portion 30 has a frusto-conical face 31 facing the surface 13 of portion 11 to form therewith a second belt receiving groove. The surface 31 has spaced radial recesses 32 forming fingers 33. The fingers 33 are slidably positioned in the recesses 15 of fixed portion 11, and the fingers 16 of said fixed portion are slidably positioned in recesses 32 to provide a continuous driving connection between portions 11 and 30 through said fingers.

The slidable portion 30 has a hub 34 having a bearing shell 35. A set screw 36, threaded into sleeve 7, limits the axial outward travel of sheave portion 30 in a direction away from fixed portion 11 to thereby prevent disengagement of fingers 16 and 33. A retaining collar 37, similar to collar 26, is threaded onto the opposite end portion 8, and a helical compression spring 38 is positioned around the sleeve 7 between said collar and the hub 34. The collar 37 is also formed with tool receiving recesses 39 in its outer face. A sleeve 42 is welded onto hub 34 and it encloses the spring 38 and collar 37, as shown.

The improved pulley is adapted to receive an endless V-belt 40 in the belt receiving groove formed by faces 31 and 13, and to receive a similar belt 41 in the belt receiving groove formed by the faces 14 and 22. The belts 40 and 41 may extend around a pair of complementary pulleys (not shown) which are of a type that provide for selective adjustment of their width. The springs 27 and 38 urge the portions 19 and 30, respectively, toward fixed portion 11, thereby urging belts 40 and 41 radially outwardly and automatically taking up all slack in said belts. The portions 19 and 30 automatically shift in accordance with any changes in belt tension which are brought about by selective adjustment of the connected complementary pulleys (not shown).

The improved pulley is compact and is simple in construction. There are no parts to get out of order or which require frequent attention. Once the collars 37 and 26 are adjusted to put the springs 27 and 38 under the desired amount of compression, no further attention is required, the pulley thereafter operating automatically.

Due to the continuous interengagement of fingers 16 and 33 and 18 and 24, no direct driving engagement between the slidable sheave portions 19 and 30 and the sleeve 7 is required.

Various changes and modifications may be made without departing from the spirit of the invention, and all of such changes are contemplated, as may come within the scope of the claims.

What I claim is:

1. A pulley, comprising: a hub adapted to be mounted on a shaft; a sheave portion fixed on said hub and having opposite frusto-conical belt engaging faces; a sheave portion axially slidably mounted on said hub on one side of said fixed sheave portion and having a frusto-conical belt engaging face facing said fixed sheave portion to provide a first belt-receiving groove; a second sheave portion axially slidably mounted on said hub on the other side of said fixed portion and having a frusto-conical belt engaging face facing said fixed portion to provide a second belt-receiving groove; interengaging fingers on said fixed and slidable sheave portions to prevent relative rotation of said portions; and stop means on said hub limiting the axial movement of said slidable sheave portions in a direction away from said fixed sheave portion and preventing disengagement of said fingers.

2. A pulley, comprising: a hub adapted to be mounted on a shaft; a sheave portion fixed on said hub and having opposite frusto-conical belt engaging faces; a sheave portion axially slidably mounted on said hub on one side of said fixed sheave portion and having a frusto-conical belt engaging face facing said fixed sheave portion to provide a first belt-receiving groove; a second sheave portion axially slidably mounted on said hub on the other side of said fixed portion and having a frusto-conical belt engaging face facing said fixed portion to provide a second belt-receiving groove; interengaging fingers on said fixed and slidable sheave portions to prevent relative rotation of said portions; and stop screws threaded into said hub and positioned for engagement by said slidable sheave portions to limit the axial movement thereof in a direction away from said fixed sheave portion and preventing disengagement of said fingers.

3. A pulley, comprising: a hub adapted to be mounted on a shaft; a sheave portion fixed on said hub and having opposite frusto-conical belt engaging surfaces; a sheave portion axially slidably mounted on said hub on one side of said fixed sheave portion and having a frusto-conical belt engaging face facing said fixed portion to provide a first belt-receiving groove; a second sheave portion axially slidably mounted on said hub on the other side of said fixed sheave portion and having a frusto-conical belt engaging surface facing said fixed portion to provide a second belt-receiving groove; axially interengaging fingers on said fixed and slidable sheave portions preventing relative rotation of said portions; an adjustable retaining collar threaded on said hub axially outwardly of each of said slidable sheave portions; a first helical compression spring surrounding said hub and positioned between one of said slidable sheave portions and the adjacent retaining collar; a second helical compression spring surrounding said hub and positioned between the other slidable sheave portion and its retaining collar; stop screws threaded into said hub axially outwardly of said slidable sheave portions and positioned for engagement by the latter to limit the axial movement of said slidable portions in a direction away from said fixed sheave portion and prevent disengagement of said fingers; and a sleeve fixed coaxially to each of said slidable sheave portions and extending outwardly therefrom in enclosing relationship with the adjacent compression spring and its retaining collar.

References Cited in the file of this patent

UNITED STATES PATENTS

| | | |
|---|---|---|
| 902,224 | Fouillaron | Oct. 27, 1908 |
| 2,247,153 | Ewart | June 24, 1941 |
| 2,480,492 | Marsow | Aug. 30, 1949 |
| 2,488,871 | Locke | Nov. 22, 1949 |
| 2,516,821 | Wright | July 25, 1950 |
| 2,633,031 | Browning | Mar. 31, 1953 |
| 2,641,981 | Pilsner | June 16, 1953 |

FOREIGN PATENTS

| | | |
|---|---|---|
| 2,160 | Great Britain | Pat. of 1912 |
| 15,266 | Great Britain | Pat. of 1911 |
| 109,001 | Sweden | Sept. 9, 1943 |
| 819,844 | France | July 19, 1937 |
| 872,177 | France | Feb. 5, 1942 |